(12) United States Patent
Lee

(10) Patent No.: US 7,944,843 B2
(45) Date of Patent: May 17, 2011

(54) PATH BASED NETWORK MANAGEMENT METHOD AND APPARATUS FOR DATA COMMUNICATION NETWORKS

(75) Inventor: Ho-Keung Lee, Brooklyn, NY (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1830 days.

(21) Appl. No.: 10/779,442

(22) Filed: Feb. 13, 2004

(65) Prior Publication Data

US 2005/0180335 A1    Aug. 18, 2005

(51) Int. Cl.
*G01R 31/08* (2006.01)
*H04L 1/00* (2006.01)
*G06F 15/177* (2006.01)

(52) U.S. Cl. ......... 370/248; 370/252; 370/255; 709/222

(58) Field of Classification Search ................ 370/248, 370/252, 242, 245, 254–258, 395.3, 395.31, 370/351, 449; 709/220–225, 218, 238, 249, 709/248

See application file for complete search history.

(56) References Cited

U.S. PATENT DOCUMENTS

| | | | |
|---|---|---|---|
| 5,185,860 A * | 2/1993 | Wu | 709/224 |
| 5,408,618 A * | 4/1995 | Aho et al. | 710/104 |
| 5,710,885 A * | 1/1998 | Bondi | 709/224 |
| 6,400,681 B1 * | 6/2002 | Bertin et al. | 370/218 |
| 6,405,250 B1 | 6/2002 | Lin et al. | |
| 6,477,590 B1 * | 11/2002 | Habusha et al. | 710/29 |
| 6,539,427 B1 * | 3/2003 | Natarajan et al. | 709/224 |
| 6,574,663 B1 * | 6/2003 | Bakshi et al. | 709/223 |
| 7,050,404 B1 * | 5/2006 | Devlin | 370/254 |
| 7,293,106 B2 * | 11/2007 | Natarajan et al. | 709/238 |
| 2003/0208572 A1 * | 11/2003 | Shah et al. | 709/223 |

OTHER PUBLICATIONS

"Optivity Network Management System 10.1", Nortel Networks, Product Brief, 2003.

\* cited by examiner

*Primary Examiner* — Aung S Moe
*Assistant Examiner* — Redentor Pasia
(74) *Attorney, Agent, or Firm* — Wall & Tong, LLP

(57) ABSTRACT

Network analysis in a network management system for a data network is improved by mapping the communication paths established in the network. Queries are sent by the network management system to each network element in the network. Queries are triggered by events within the network, for example, after notification by a network element that a communication path is being set up. Each query sent by the network management system requests certain connection and topology information from the network elements. Using this information, the network management system constructs the overall network topology and performs a path analysis to map completely each communication path through the network. When the communication path mapping is complete, various types of analyses are performed using the communication path information. These analyses include but are not limited to network capacity analysis, network performance analysis, and network fault analysis. Through the use of a network analysis engine module communicating with the network elements, the present network management system can interpret multiple networking protocols and different routing protocols.

23 Claims, 3 Drawing Sheets

PATH BASED NETWORK MANAGEMENT METHOD AND APPARATUS FOR DATA COMMUNICATION NETWORKS

TECHNICAL FIELD

This invention relates to data communication networks and, more particularly, to network management of those networks.

BACKGROUND OF THE INVENTION

Network management systems have been used to configure, analyze, and troubleshoot network equipment in a communication network in the past. These systems have provided the ability to visualize the network, to provision new equipment in the network, to perform fault detection within the communication network, and to perform other diagnostic testing for identifying network problems. In some cases, the network management systems have been limited to working only with network equipment manufactured by a single vendor.

In conventional communication networks such as the public switched network, each network element needs to be configured. Generally that is an administrative task performed by a network management system. Once the network is provisioned and configured, the network management system develops and maintains the network topology. The network management system also has the intelligence to create the communication path within the network. In order to this in an automated way, the network management system transmits a set of commands to each of the network elements required for creation of the communication path. If the network management system lacks the automated intelligence to create the communication path, a network engineer is dispatched to create the required communication path manually. In either case, the network management system stores the communication path for future use.

Using information about the communication paths stored in the network management system, it becomes possible to analyze operational and performance characteristics of the communication network. For example, network capacity can be calculating by adding the set communication paths across communication links in the network. Network performance of each circuit in the communication network can be queried based on the communication path of that circuit. Network faults can also be correlated to indicate the communication paths that are affected by a network fault. For conventional communications networks, all this is done within the network management system.

Current communication networks based on technology such as asynchronous transfer mode (ATM) and frame relay (FR) are more dynamic and complex. These networks are managed by network management systems that are different from their counterpart systems used in conventional communications networks. A network management system in current dynamic networks no longer maintains information on the communication paths set up and operating within the network. In addition, the network management system is no longer responsible for setting up communication paths to the individual network elements. Instead, the network elements in such dynamic networks individually store at least a limited, local portion of the network topology (e.g., the nearest neighboring network elements) and, based in part on this information, they create a communication path through the network by extending the path from one network element to the next. Each network element bears the responsibility for extending the communication path to its neighboring network element.

For the more dynamic and complex data networks today, there is no single place within the network or its management system in which to find communication paths stored. The network management system no longer has any information on the communication path. But, information about a particular communication path is distributed among the network elements that make up the path. An individual network element stores in a connection table only the portion of the communication path that extends from itself to the next node. Each individual network element also stores information in its topology table about link and routing addresses found by upstream network elements. Without information about communication paths in the network, analysis of the communication network is difficult, if not impossible. At best, current network management systems can only analyze traffic at the origination and destination points in the network but not for a call or a path at the points in between. These network management systems cannot perform a call-based or path-based analysis. In fact, the analysis of the communication network without such data lacks meaning since the network management system will not have any knowledge of the communication network.

SUMMARY OF THE INVENTION

Network analysis in a network management system for a data network is improved by mapping the communication paths established in the network. Queries are sent by the network management system to each network element in the network. Each query sent by the network management system requests certain connection and topology information from the network elements. Using this information, the network management system constructs the overall network topology and performs a path analysis to map completely each communication path through the network. When the communication path mapping is complete, various types of analyses are performed using the communication path information. These analyses include but are not limited to network capacity analysis, network performance analysis, and network fault analysis.

In one embodiment of the present invention, queries are triggered by events within the network. For example, queries are transmitted after notification by a network element that a communication path has been set up within the network.

Through the use of a network analysis engine module controlling tasks by communicating with the network elements, the present network management system can interpret multiple networking protocols including, but not limited to, FR, ATM and Multi-Protocol Label Switching (MPLS). The present network management system can also interpret different routing protocols including but not limited to Private Network/Network Interface (PNNI), Virtual Network Navigator (VNN), Open Shortest Path First (OSPF), and Border Gateway Protocol (BGP). In one embodiment, the task controller within the network management system is driver-based in order to provide flexibility for handling multiple protocols simultaneously. This permits the network management system to operate in large, multi-protocol networks having network elements from different vendors.

BRIEF DESCRIPTION OF THE DRAWINGS

A more complete understanding of the invention may be obtained by reading the following description of specific illustrative embodiments of the invention in conjunction with the appended drawing in which.

In order to facilitate understanding, identical reference numerals have been used in the Figures, where possible, to designate identical elements that are common to several figures.

DETAILED DESCRIPTION

Current data communication networks do not establish communication paths from a single centralized node or controller or management system within the network. Instead, the responsibility for setting communication paths is distributed among each of the network elements in the network. Communication paths are established one link at a time by each network element in the path under its own control. As a result, the communication path is not known in toto at any place in the network. Since the network management systems no longer have the communication path information that they have been accustomed to having as, for example, in the public switched network, they are not able to perform the same degree of network analysis that was provided in the static networks of the past. This leads to the inability to troubleshoot and measure the communication network. Such shortfalls can lead to declining customer satisfaction and loss of revenue for the service provider.

Analysis of today's dynamic networks is at the heart of the present network management method and apparatus described below. The present invention is capable of effectively and accurately mapping communication paths established by the network elements and thereby analyzing data communication networks on the basis of these communication paths.

Figure 1:
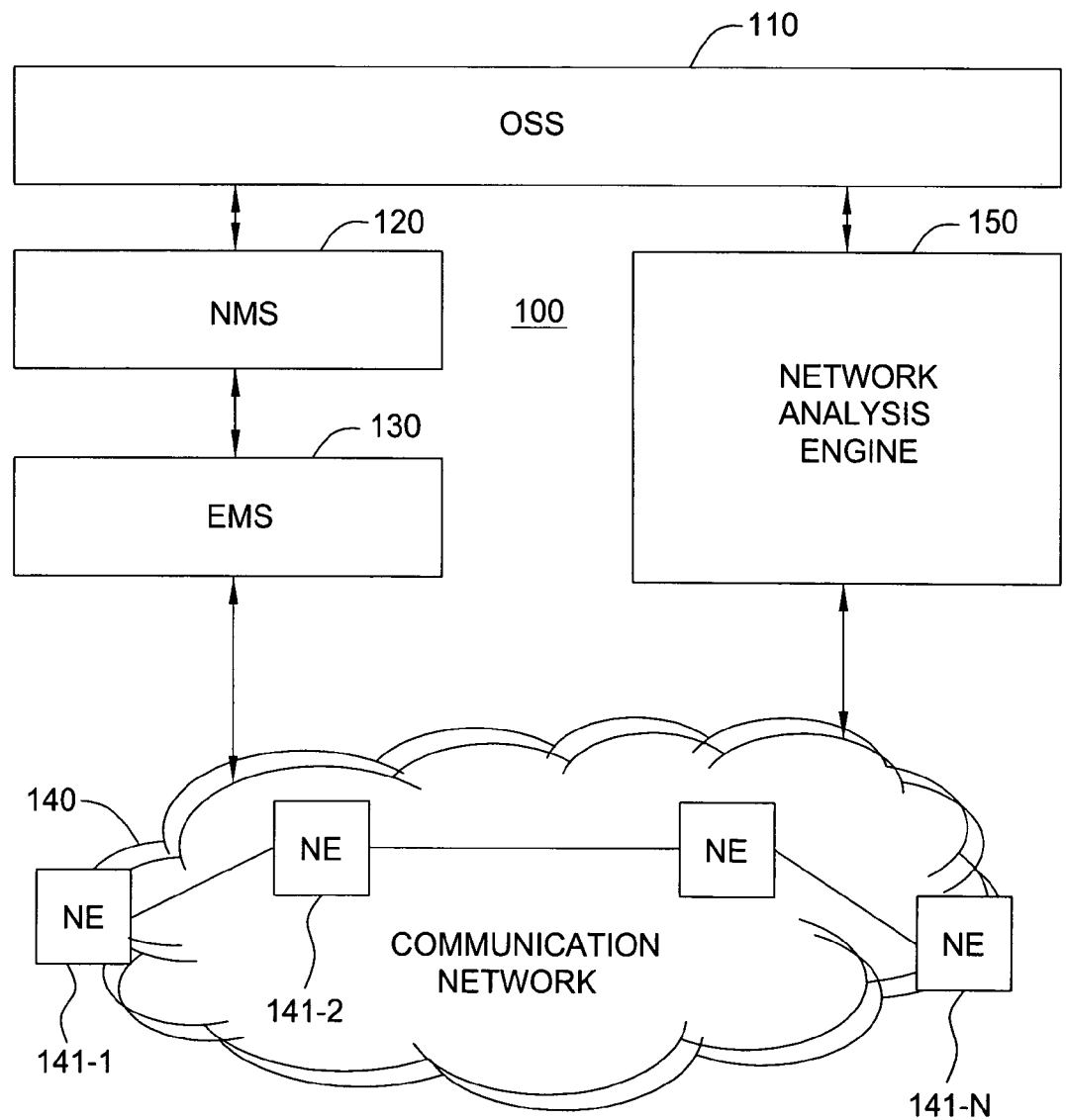
FIG. 1 shows a simplified block diagram representation of a data communication network management system in accordance with the present invention.

FIG. 1 depicts a high-level block diagram of an embodiment of a data communication network management system 100 in accordance with the present invention. The data communication network management system 100 comprises an operational support system (OSS) 110, a network management system (NMS) 120, a network element management system (EMS) 130, and a network analysis engine module 150. System 100 operates in conjunction with a communication network 140, which includes a plurality of network equipments (NE) 141-1 through 141-N. The network elements 141 are connected together to form the communication network 140. Communication paths are established for customers through the network by various interconnections of the network elements 141.

Network element management system 130 performs tasks that pertain to a network element, whereas the network management system 120 performs operations that involve multiple network elements and usually span the entire network. Examples of such systems are manufactured and sold by Lucent Technologies Inc. under the Navis® product suite. It is understood in the art that neither Network element management system 130 nor network management system 120 define communication paths through the communication network 140. Operational support system 110 is well-known in the art and performs operation specific tasks to facilitate the operator of the communication network. Examples of such systems are also manufactured and sold by Lucent Technologies Inc. under the same Navis® product suite.

Network analysis engine module 150 is an integral element of the management system that is preferably a software based utility. Network analysis engine module 150 interacts with operational support system 110 and network elements 140 with the ability to analyze configuration information from the network and pass useful information about the communication paths and the network topology to the operational support system 110. Using this information, the operational support system 110 can display it to the network operator. Since it is preferably a software-based engine, network analysis engine module 150 can share the same platform as the network element management system 130 or network management system 120. This approach for sharing and existing network platform provides a potentially lower cost than the cost of maintaining a new platform for obtaining the added functionality of the network analysis engine module 150.

Figure 2:
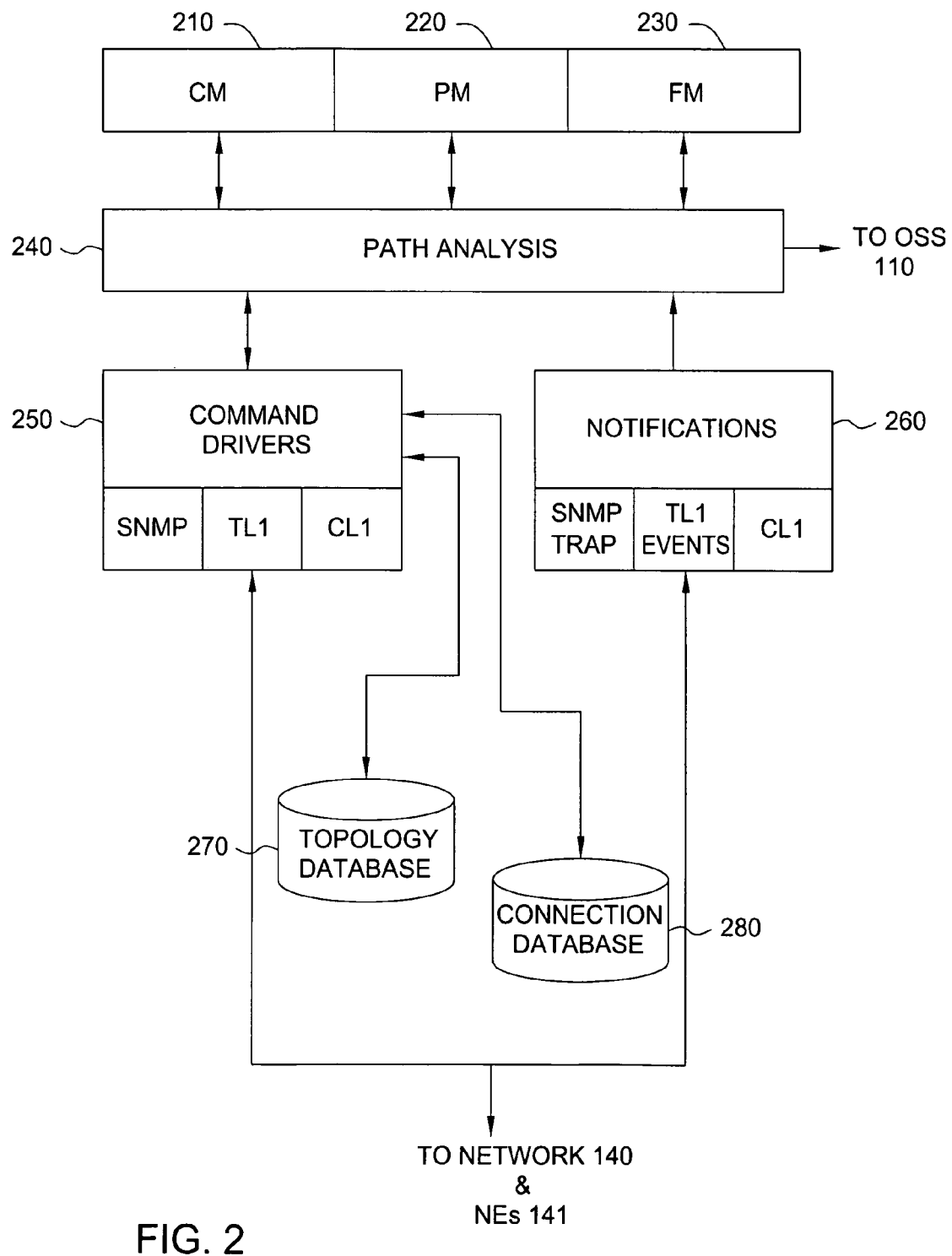
FIG. 2 shows a more detailed block diagram of one embodiment of a network analysis engine module suitable for use in the system depicted in FIG. 1.

FIG. 2 depicts a high-level block diagram of an embodiment of an exemplary network analysis engine module 150 of FIG. 1 in accordance with the present invention. The network analysis engine module 150 comprises of a capacity manager module (CM) 210, a performance manager module (PM) 220, a fault manager module (FM) 230, a path analysis module 240, a command driver module 250, a notifications handler module 260, a topology database module 270, and a connection database module 280. Network analysis engine module 150 communicates with the operational support system 110 and individual network elements 141 in communications network 140.

In operation, network analysis engine module 150 yields critical information about the communication path by querying all the network elements 141 in a communication path. The communication path is understood to be a path that is established between two or more customers of the network. The communications path is established by and under control of the associated network elements 141 in the communication path. Initially, notifications handler module 260 receives notification signals from the associated network elements 141 when the communication path has been created or deleted. Generally notification is received from the origination and destination network elements. The notification signals can arrive at the notifications handler module 260 in many different formats. Some common formats or protocols for the notification signals are Simple Network Management Protocol (SNMP), Translation Language 1 (TL1), or Command Line Interface (CLI), for example. In SNMP, notifications of network events are referred to as traps. Similarly, in TL1, notifications of network events are referred to as events. These notifications allow the network elements to inform or alert network management systems about the existence of certain network conditions. Notifications handler module 260 translates an arriving notification signal into a common format that is recognizable and usable by the network analysis engine module 150 and, more particularly, by the path analysis module 240.

Path analysis module 240 uses the translated notification signals from notifications handler module 260 as a trigger to initiate a discovery of new communication paths in network 140. When the translated notification signal is received by path analysis module 240, module 240 generates a request for information from a particular network element, usually the network element associated with the received notification signal. The request is transmitted via the command drivers module 250 to connection database 270 and topology database 280. If the requested information is found in the databases, that information is immediately fetched from the databases and sent to path analysis module 240. However, if the requested information is not found in the databases, the information must be queried by the command drivers module 250 from the network element.

Upon notification, the network analysis engine module 150 can initiate many different tasks. It can, immediately or on a delayed basis, discover and map the path about which it was just notified. Delaying is possible if it is desired to avoid periods when network traffic is high. In general, when a notification signal is received, only the new path is discovered and mapped. While it is possible to discover and map all paths through the network when a notification arrives, it is desirable to minimize the workload and map the single path of interest about which the notification was received. It is believed to be clear to those skilled in the art that, if the network analysis engine module 150 chooses to delay the discovery and mapping process, it can group all or many of the requests together until an appropriate time such as a low traffic period for the network and thereby discover new paths all at once. This approach advantageously minimizes queries to the network elements. However, it introduces delay in providing any analysis of the communication network until the discovery and mapping is completed.

Command drivers module 250 provides the correct query interfaces for the network elements from different protocols such as SNMP, TL1 and CLI. Module 250 communicates with the network topology database module 270 and connection database module 280 in order to develop the query of the network element for network information needed by the path analysis module 240. As the querying and analysis process iterates, it moves to each successive network element in the communication path of interest until it has traversed the entire communication path from the originating network element to the destination network element. At this point, the entire communication path is mapped and maintained by the path analysis module 240.

Information gathered through this querying process includes local network information from the queried network element 141. More specifically, local network information usually includes topology information and communication path information known by the particular network element. As described above, for these complex data networks, information about the network is distributed in each of the network elements of that network. Topology of the network is known locally by a network element about its neighboring network elements to which it is connected. Similarly, information about the communication path that is known by a particular network element involves only the path that extends to its connected neighboring network elements. In most cases, the topology information and the communication path information come from the routing and connection tables stored at the network element 141. A connection table is defined a set of rules that define how traffic is to be switched in to and out of the network element hence creating a connection through that piece of equipment. A routing table includes a set of routes learned from neighboring nodes or manually defined. These routes define how connections should be routed during call-setup. These definitions apply to call-based or path-based data networks as opposed to IP-based networks which are connectionless.

Using the local network information gathered from each network element in the communication path, the path analysis module 240 analyzes this information to map the entire communication path of interest. The communication path is stored and used by any of capacity manager module 210, performance manager module 220 and fault manager module 230 for performing a desired analysis of the network. While fault and performance managers are available today for network management systems, they cannot analyze the entire call path. Usually, their analysis is based on interaction with the origination and destination nodes. The managers described herein provide a more complete analysis because they are able to analysis performance, capacity, and faults for each and every call path set up in the network and, more specifically, for each and every network element along a particular call path.

Capacity manager module 210 measures the capacity of the network. By combining all the results of the communication path analysis, capacity manager module 210 measures the amount of traffic that has been provisioned on every link in the communication network. It can also provide an alarm to the network operator when a communication path established in the communication network is not optimized. Such measures can be help the network operator maximize throughput in the network because the communication network is generally designed using an assumption that the communication paths are optimized for maximum throughput.

Performance manager module 220 analyzes the performance of the network. Using the results of the communication path analysis, performance manager module 220 collects port and circuit statistics along the communication path, where ports are generally known as the link between network elements and where circuits are generally known as the connection at the network element. The performance analysis results are then passed along to the operational support system 110 where the network operator can perform troubleshooting and proactively pinpoint potential failures in the communication network.

Fault manager module 230 correlates faults in the network with the communication paths. Whenever a network element module 141 in communication network 140 reports a fault, it is possible that communication paths are affected. Therefore, it is critical that the network operator realize which particular communication paths are affected by the failure so that appropriate actions can be taken.

Although communication paths are re-routed by the network elements in the communication network 140, actions can be taken to fix the root cause of the fault by dispatching an engineer, for example. After the fault condition has been fixed, communication network 140 will not normally re-route traffic back to the call-paths originally assigned since such re-routing would involve outages when the original communication path is being re-established. In order to re-establish the original communication paths, network operator must perform this work at the desired time. Given the path information already collected by the path analysis engine module, the operator can use the analysis done above to identify communication paths affected by the fault. Restoration of the communication paths can then be performed automatically by the network management system or manually by the operator after the affected communication paths are identified.

Figure 3:
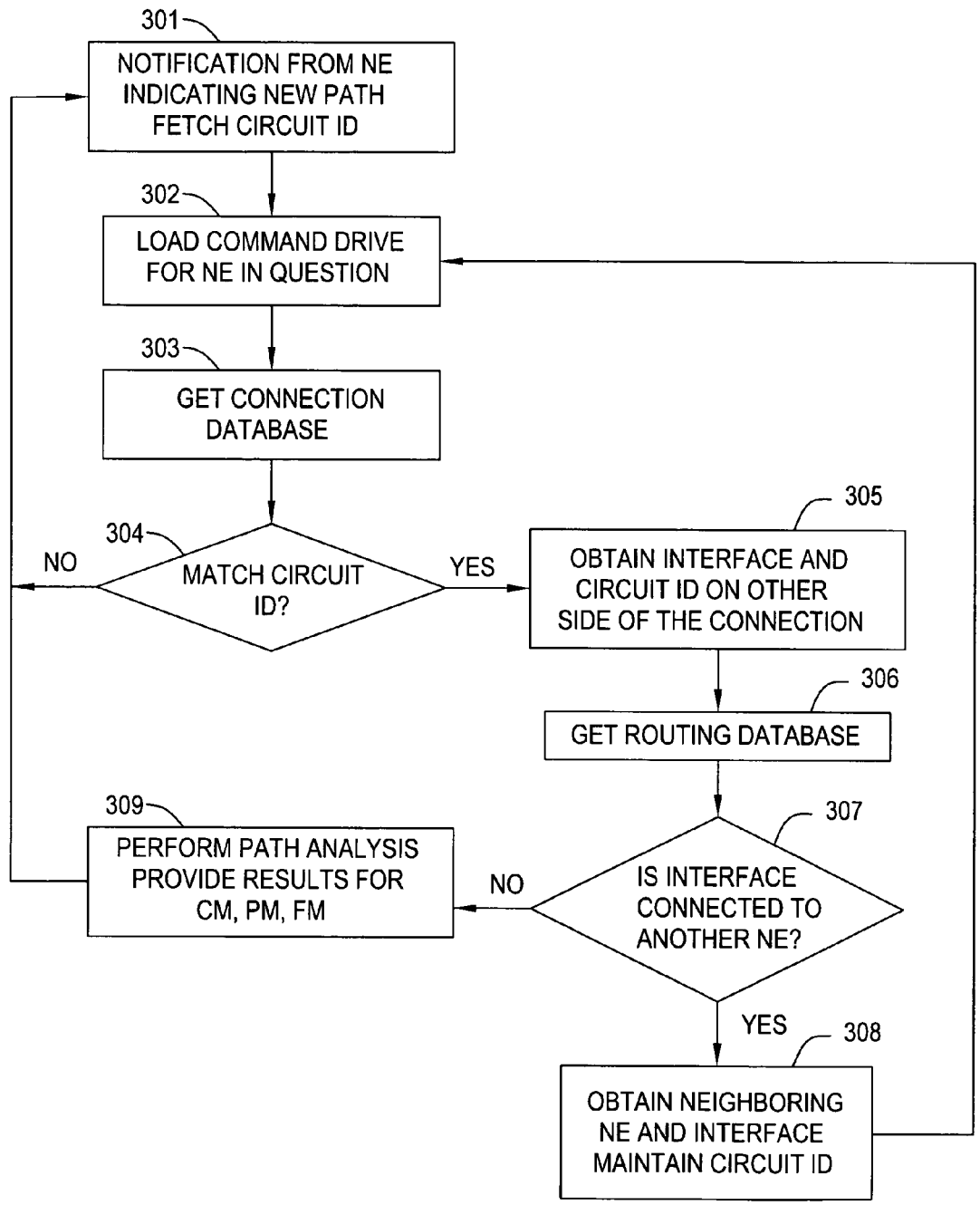
FIG. 3 shows a flowchart describing a network management method in accordance with an aspect of the present invention.

FIG. 3 depicts a flow chart of an exemplary embodiment of a method for mapping communication paths in accordance with the present invention. The flowchart represents a process that can be used by the network analysis engine module 150 and, more specifically, by the path analysis module 240.

The method of FIG. 3 is entered at step 301 when the network element 141 in communication network 140 creates a new communication path. Network element 141 provides a notification signal to the notifications handler module 260 that, in turn, translates into a translated notification signal for the path analysis module 240. The translated notification signal informs the path analysis module that a communication path is being either formed or deleted in the communication network. Along with the notification, the network element generally provides communication path information such as a circuit identifier.

At step 302, path analysis module causes the command driver module to be loaded with the correct protocol information associated with the network element that the module seeks to involve in querying. For example, in the initial query, the command drivers module communicates with the network element that transmitted the original notification signal. The use of command drivers enables the system to handle a variety of different network elements through an expansive driver library, that is, multiple protocols from multiple equipment vendors. This allows the flexibility to add new network element types to communication network at any time without disturbing the operational capability of the data communication network management system 100. It also allows for handling of different protocols such FR, ATM, and MPLS where communication networks have different inter-networking protocols.

At step 303, a query from the command drivers module is received by the specified network element requesting local network information from the network element. In one exemplary embodiment of local network information, connection database is fetched from the network element and forwarded back through the command drivers module to the path analysis module. In the path analysis module, the method attempts to match the circuit identifier received in step 301 against local network information (e.g., the connection database) received from the network element in step 303. At step 304, if a match is not found for the circuit identifier, then the communication path does not exist and the method 300 will wait for a new notification. However, if a match is found for the circuit identifier, the process proceeds to step 305.

At step 305, the connection entry matching the desired circuit identifier is selected from the connection database received from the network element. Using the connection entry found in step 304, the path analysis module obtains the interface and circuit identifier on the other side of the connection entry. Inotherwords, the path analysis module finds the information that is associated with the next element in the communication path.

At step 306, the path analysis module causes the command drivers module to query the same network element for topology information. In one exemplary embodiment, the routing database is fetched from the network element in step 301. Using the interface information from the connection information obtained in step 305 and the routing database obtained in step 306, the path analysis module determines if the interface is connected to another network element. Typically, the routing database includes information identifying all the network elements connected to the queried network element.

At step 307, if the path analysis module determines that the interface is not connected to another network element, the mapping is complete for the communication path under investigation. The path analysis module then stores the communication path and turns the path information over to the capacity manager module 210, the performance manager module 220, or the fault manager module 230 in step 309. However, if the path analysis module determines in step 307 that the interface is connected to another network element, then the process advances to step 308.

At step 308, the neighboring network element and interface in the communication path under analysis is obtained from the routing database fetched at step 306. The circuit identifier remains the same as the one fetched in steps 301 and 305 because the circuit identifier is the same for the entire communication path. At this point, the process will repeat itself since the communication path has not been fully mapped yet. This information about the next network element in the communication path is passed to step 302 and the process iterates in this manner until the end of the communication path is reached.

As noted above with respect to FIG. 1, the operational support system (OSS) 110, the network management system (NMS) 120, the network element management system (EMS) 130, and the network analysis engine module 150 are provided within the data communication network management system 100. As known to those skilled in the art, each of these functional elements is implemented by a computer system executing software to perform various functions. Further, as noted above, it is preferable that the network analysis engine module is a software-based engine which may share the same platform (i.e., software platform) as the network management system and/or the network element management system. This advantageously provides lower maintenance cost than maintaining additional software platforms.

Therefore, in various embodiments of the invention, any or all of the operational support system, the network management system, the network element management system, and the network analysis engine module are implemented within the context of a computer system having at least a processor for executing instructions, a memory for storing instructions to be executed, and an input/output functionality for receiving instructions. Thus, a computer executing software instructions, according to the present invention, implements various functionalities described herein with respect to any or all of the operational support system, the network management system, the network element management system, and the network analysis engine module. Thus, in one embodiment of the invention, the method steps implemented in any of the operational support system, the network management system, the network element management system, and the network analysis engine module are implemented after being stored in memory, and executed by a processor to achieve various functions.

While the foregoing is directed to the illustrative embodiments of the present invention, other and further embodiments of the invention may be devised without departing from the basic scope thereof, and the scope thereof is determined by the claims that follow.

The invention claimed is:

1. A network element management system (NEMS) including processing equipment adapted to perform a method of analyzing a plurality of network elements configured to support at least one established communication path in a network, the method comprising:

(a) receiving from one of a plurality of network elements included within an established communication path, a notification signal indicative of the existence of the established communication path;

(b) requesting local network information from a network element included within the established communication path;

(c) receiving from the network element the requested local network information, the local network information comprising one or more of topology information, connection information and performance information;

(d) analyzing the received local network information to map an associated portion of the established communication path;

(e) responsive to the received local network information and the corresponding mapped portion of the established communication path, selecting a next network element of the established communication path; and repeating steps (b)-(e) for the next selected network element.

2. The NEMS as defined in claim 1, wherein the method further comprises: determining network capacity using communication path data from the analyzing step.

3. The NEMS as defined in claim 1, wherein the method further comprises: determining network performance using communication path data from-the analyzing step.

4. The NEMS as defined in claim 1, wherein the method further comprises: detecting network faults using communication path data from the analyzing step.

5. The NEMS as defined in claim 1, wherein the topology information includes a routing table and wherein the connection information includes a connection table.

6. The NEMS as defined in claim 1, wherein the next selected network element comprises a neighboring network element.

7. A network element management system (NEMS) including processing equipment adapted to perform a method for analyzing a plurality of network elements configured to support at least one established communication path of a network, the method comprising:

receiving a notification signal from a network element, said notification signal indicative of a new established communication path in the network, said notification signal including circuit identifier information;

querying the network element in the network for connection information;

receiving the connection information from the network element in response to querying;

comparing the connection information with the circuit identifier information to determine a match condition; and if the match condition occurs in the comparing step:
  querying the network element for routing information;
  receiving the routing information from the network element;
  analyzing the routing information received to map the new established communication path in the network;
  selecting a next network element to query along the new established communication path; and
  if the next network element has been selected, fetching from the received circuit identifier information, circuit identifier information associated with the next network element and iterating the method from the step of querying for the connection information for the next network element.

8. The NEMS as defined in claim 7, wherein the method further comprises:
storing communication path data of the established communication path in the network.

9. The NEMS as defined in claim 7, wherein the method further comprises:
determining network performance using communication path data about the established communication path mapped in the analyzing step.

10. The NEMS as defined in claim 7, wherein the next selected network element comprises a neighboring network element.

11. An Apparatus comprising:
a plurality of network elements interconnected to form a communication network and configured to support at least one established communication path in the communication network;
a network analysis engine module adapted to perform, responsive to receiving from one of the plurality of network elements included within the at least one established communication path, a notification signal for querying a network element in the communication network for local network information, the local network information comprising one or more items selected from the group including topology information, connection information, and performance information, wherein the notification signal is indicative of the existence of the established communication path;

responsive to receipt of the local network information, an analysis of the local network information received to map an associated portion of the established communication path; and responsive to the local network information received and the corresponding mapped portion of the established communication path, a selection of a next network element of the established communication path;

wherein the querying function is further responsive to a notification that the next network element has been selected.

12. The apparatus as defined in claim 11, wherein the querying function further comprises:
receiving the notification signal from one or more network elements, the notification signal indicative of a network event.

13. The apparatus as defined in claim 11, further comprising:
determining network capacity using communication path data of the established communication path from the analysis function.

14. The apparatus as defined in claim 11, further comprising:
determining network performance using communication path data of the established communication path from the analysis function.

15. The apparatus as defined in claim 11, further comprising:
detecting network faults using communication path data of the established communication path from the analysis function.

16. The apparatus as defined in claim 11, wherein the topology information includes a routing table and wherein the connection information includes a connection table.

17. The apparatus as defined in claim 11, further comprising:
storing communication path data of the established communication path in the network.

18. The apparatus as defined in claim 11, wherein the next selected network element comprises a neighboring network element.

19. A non-transitory computer readable storage medium storing instructions, wherein the instructions, when executed by a processor, cause the processor to perform a method for analyzing a plurality of network elements configured to support at least one established communication path in a network, the method comprising:

(a) receiving from one of the plurality of network elements included within an established communication path, a notification signal indicative of the existence of the established communication path;

(b) requesting local network information from a network element included within the established communication path;

(c) receiving from the network element the requested local network information, the local network information comprising one or more of topology information, connection information and performance information;
(d) analyzing the received local network information to map an associated portion of the established communication path;
(e) responsive to the received local network information and the corresponding mapped portion of the established communication path, selecting a next network element of the established communication; and
repeating steps (b)-(e) for the next selected network element.

20. The non-transitory computer readable storage medium as defined in claim 19, wherein the method further comprises: determining network capacity using communication path data from the analyzing step.

21. The non-transitory computer readable storage medium as defined in claim 19, wherein the method further comprises: determining network performance using communication path data from the analyzing step.

22. The non-transitory computer readable storage medium as defined in claim 19, wherein the method further comprises: detecting network faults using communication path data from the analyzing step.

23. The non-transitory computer readable storage medium as defined in claim 19, wherein the next selected network element comprises a neighboring network element.

* * * * *